United States Patent
Chang et al.

(10) Patent No.: US 8,018,344 B2
(45) Date of Patent: Sep. 13, 2011

(54) WIRELESS COMMUNICATION APPARATUS AND METHOD THEREOF

(75) Inventors: Wei Chang, Hsinchu (TW); Chien-Sheng Chen, Hsinchu County (TW); Chih-Yuan Hsieh, Taichung County (TW)

(73) Assignee: MStar Semiconductor, Inc., ChuPei, Hsin-Chu Hsien (TW)

( * ) Notice: Subject to any disclaimer, the term of this patent is extended or adjusted under 35 U.S.C. 154(b) by 353 days.

(21) Appl. No.: 12/365,174

(22) Filed: Feb. 4, 2009

(65) Prior Publication Data

US 2009/0212917 A1    Aug. 27, 2009

(30) Foreign Application Priority Data

Feb. 26, 2008 (TW) ................ 97106605 A

(51) Int. Cl.
G08B 13/14 (2006.01)
H04Q 5/22 (2006.01)
G08C 19/16 (2006.01)
G08C 19/12 (2006.01)
H04B 7/00 (2006.01)
H04B 1/46 (2006.01)
H04M 1/00 (2006.01)

(52) U.S. Cl. ............. 340/572.1; 340/10.1; 340/10.4; 340/12.1; 340/13.2; 455/82; 455/552.1; 455/41.2

(58) Field of Classification Search ............... 340/10.1, 340/10.4, 10.5, 825.69, 825.72, 10.41; 455/82, 455/552.1, 41.2

See application file for complete search history.

(56) References Cited

U.S. PATENT DOCUMENTS

| | | | |
|---|---|---|---|
| 6,600,428 B1 * | 7/2003 | O'Toole et al. ............ 340/10.34 |
| 7,215,976 B2 * | 5/2007 | Brideglall ................... 455/552.1 |
| 7,775,442 B2 * | 8/2010 | Saarisalo ....................... 235/487 |
| 2005/0248438 A1 * | 11/2005 | Hughes et al. ................ 340/10.4 |
| 2006/0135084 A1 * | 6/2006 | Lee .................................. 455/78 |
| 2007/0024423 A1 * | 2/2007 | Nikitin et al. ................. 340/10.1 |
| 2007/0109101 A1 * | 5/2007 | Colby ........................... 340/10.4 |
| 2007/0159338 A1 * | 7/2007 | Beber et al. ................. 340/572.8 |
| 2007/0207744 A1 * | 9/2007 | Rofougaran et al. ........... 455/73 |
| 2007/0229261 A1 * | 10/2007 | Zimmerman et al. ...... 340/572.1 |
| 2007/0274242 A1 * | 11/2007 | Lamacraft et al. ............ 370/310 |
| 2007/0293155 A1 * | 12/2007 | Liao et al. .................... 455/41.2 |
| 2008/0144551 A1 * | 6/2008 | Rakshani et al. ............. 370/310 |
| 2009/0001930 A1 * | 1/2009 | Pohjonen ....................... 320/108 |
| 2009/0088077 A1 * | 4/2009 | Brown et al. ................. 455/41.2 |
| 2009/0093272 A1 * | 4/2009 | Saarisalo et al. ............. 455/558 |

FOREIGN PATENT DOCUMENTS

CN         1980073 A     6/2007

* cited by examiner

*Primary Examiner* — Daniel Wu
*Assistant Examiner* — Emily C Terrell
(74) *Attorney, Agent, or Firm* — Winston Hsu; Scott Margo

(57) ABSTRACT

A wireless communication method utilizing a wireless communication apparatus is provided. The method includes: providing an antenna unit being used by both a first wireless communication circuit and a second wireless communication circuit, using the first wireless communication circuit for RFID communication via the antenna unit in a first mode, and utilizing the second wireless communication circuit for RFID communication via the antenna unit in a second mode.

15 Claims, 4 Drawing Sheets

WIRELESS COMMUNICATION APPARATUS AND METHOD THEREOF

CROSS REFERENCE TO RELATED PATENT APPLICATION

This patent application is based on a Taiwan, R.O.C. patent application No. 097106605 filed on Feb. 26, 2008.

BACKGROUND OF THE INVENTION

1. Field of the Invention

The present invention relates to a radio-frequency identification (RFID) communication scheme, and more particularly to a near field communication (NFC) apparatus using the RFID technology, and a method thereof.

2. Description of the Prior Art

The latest mobile phones with a near field communication (NFC) function have built-in radio-frequency identification (RFID) circuits. The RFID circuit includes the capabilities of peer-to-peer communication with an external RFID circuit, reading data of an external RFID tag, and simulating as an RFID tag. A user can therefore replace an original RFID card (such as a travel card) with his/her mobile phone when utilizing an underground travel system, such as the Taipei's Mass Rapid Transit (MRT) system. A denouncing problem can arise, however. For instance, when the user enters a station A of the MRT system, the user uses the RFID circuit within the mobile phone to communicate with an RFID reader of a gate in the station A for recording the station the user enters. When leaving the MRT system at another station B, the user uses the RFID circuit to communicate with an RFID reader of a gate in the station B, and then the RFID reader of the station B reads the recorded information from the RFID circuit for determining the traveling expenses the user should pay. If the battery of the mobile phone is exhausted while the user is still inside the MRT system, the user cannot use the RFID circuit built within the mobile phone to communicate with the RFID reader at an exit gate; this is because the RFID reader is designed as being powered by the battery of the mobile phone. In this situation, the user cannot pay the traveling expenses for the MRT system using the mobile phone. It is not convenient for the user. Additionally, when the user changes his/her mobile phone, the user is faced with the risk of losing any remaining money recorded by the old mobile phone since the amount may not be transferred to the user's new mobile phone. Regularly, the amount of money is recorded on another circuit within the mobile phone. Thus, unless a conversion scheme between different mobile phone manufacturers or different service providers can be designed beforehand, the money cannot be directly transferred to and recorded in a circuit built within the new mobile phone when the user changes his/her mobile phone.

Regarding a well-known conversion scheme, the RFID circuit is arranged to transmit data associated with the amount of remaining money to the host circuit of the old mobile phone, and the host circuit is arranged to record the data into the SIM card. Thus, after changing mobile phones, if the SIM card is still used by the user, the user can continue to use the remaining money as payment. Moreover, in the situation where the battery of the mobile phone is exhausted while the user is inside the MRT system, a recently provided solution proposes that the SIM card includes a dual interface. That is, the SIM card has the communication functions of both a SIM card and RFID. The SIM card is connected to an antenna of another NFC circuit and installed within the mobile phone before it is used. Therefore, the user can still use the mobile phone to replace the conventional RFID card to pay traveling expenses when the user travels by the MRT system. When the user exits the MRT system, an RFID reader installed at the gate communicates with the above-mentioned SIM card for the purpose of collecting traveling expenses. The SIM card having the dual interface, however, only provides the function of making payments, but does not include the functions regarding pier-to-pier data transmission and reading data of an RFID tag. It is hoped that a single handheld product such as a mobile phone can integrate diversified applications, where the above-mentioned RFID circuit built in the mobile phone will be required. If the RFID circuit, the SIM card having the dual interface, and the related antenna connected to the SIM card are all installed within the mobile phone to achieve the objective of the mobile phone being integrated with diversified applications, then, in practice, the mobile phone should include two antennas operating at the same frequency. This substantially increases the manufacturing costs, the size of the circuit area of the mobile phone, and the layout difficulty.

SUMMARY OF THE INVENTION

Therefore, an objective of the present invention is to provide an NFC apparatus capable of performing different radio-frequency identification (RFID) communication by sharing an antenna unit, and a related method, to achieve the goals of decreased production cost and circuitry size.

According to an embodiment of the present invention, a wireless communication apparatus is disclosed. The apparatus comprises an antenna unit, a switch module, and a first and a second NFC circuit. The switch module is coupled to the antenna unit, and the first NFC circuit is coupled to the antenna unit and performs RFID communication operation via the antenna unit. The second NFC circuit is coupled to the switch module, and controls the state of the switch module to perform RFID communication operations via the antenna unit. The first and second NFC circuits share the antenna unit.

According to an embodiment of the present invention, a wireless communication method is further disclosed. The method comprises the steps of: providing an antenna unit being shared by a first and a second NFC circuit, utilizing the first NFC circuit to perform RFID communication operations through the antenna unit under a first mode, and utilizing the second NFC circuit to perform RFID communication operations through the antenna unit under a second mode.

According to an embodiment of the present invention, a wireless communication apparatus is further disclosed. The wireless communication apparatus comprises an antenna unit, a first wireless communication circuit, and a second wireless communication circuit. The first wireless communication circuit is coupled to the antenna unit and performs RFID communication operations through the antenna unit, and the second wireless communication circuit is coupled to the antenna unit and performs RFID communication operations through the antenna unit; wherein the first and second wireless communication circuits share the antenna unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
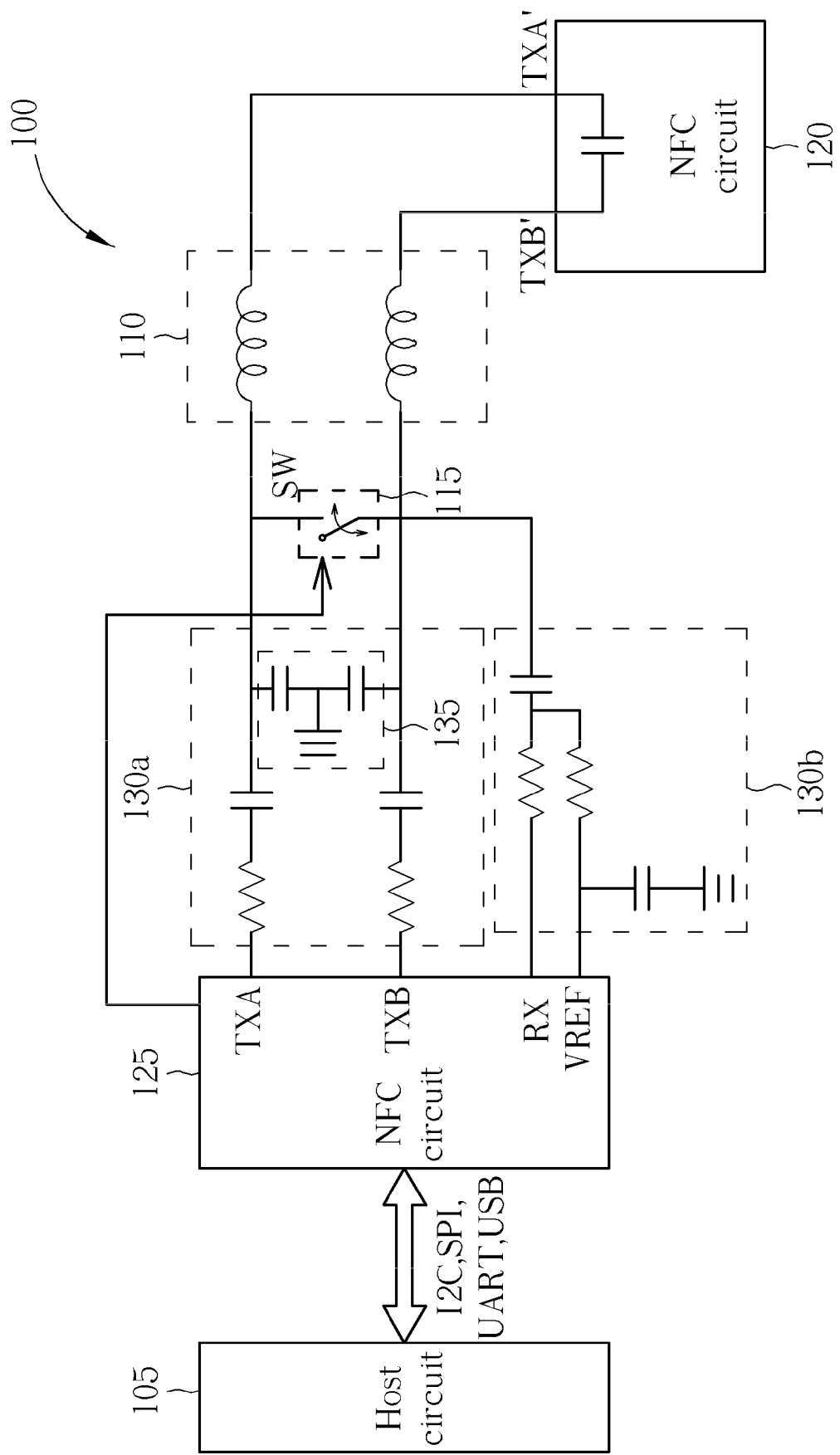
FIG. 1 is a diagram of a near field communication (NFC) apparatus according to a first embodiment of the present invention.

Please refer to FIG. 1. FIG. 1 is a diagram of a near field communication (NFC) apparatus 100 according to a first embodiment of the present invention. The NFC apparatus 100, such as a mobile phone having radio-frequency identification (RFID) communication functionality, comprises a host circuit 105, an antenna unit 110, a switch module 115 including a switching element SW therein, two NFC circuits 120 and 125, two impedance matching circuits 130a and 130b, and a voltage regulating and filtering circuit 135. The antenna unit 110 is represented by two inductors, but can be represented by only one inductor in another example. Additionally, the voltage regulating and filtering circuit 135 is an optional element; this is not a limitation to the present invention. Regarding the circuitry configuration, the first transmission terminal TXA' of the NFC circuit 120 is coupled to the first end of the antenna unit 110, and the first transmission terminal TXA of the NFC circuit 125 is coupled to the second end of the antenna unit 110 and the first end of the switching element SW. The second transmission terminal TXB of the NFC circuit 125 is coupled to the second end of the switching element SW, and further connected to the second transmission terminal TXB' of the NFC circuit 120 through the antenna unit 110.

In this embodiment, the NFC circuit 125 is built in the NFC apparatus 100 and includes the functionalities of pier-to-pier data communication with an external RFID circuit, reading information from an external RFID tag, and simulating as an RFID tag. The NFC circuit 125 is an active RFID circuit, which means that the NFC circuit 125 is powered by the battery of the NFC apparatus 100. The NFC circuit 125 outputs a differential transmitting signal from the transmission terminals TXA and TXB to an external receiving circuit via the antenna unit 110, and receives a signal coming from the antenna unit 110 at the receiving terminal RX. The NFC circuit 120 can be implemented by a semi-active/passive RFID circuit. In this embodiment, the NFC circuit 120 is a passive RFID circuit set up on a user's subscriber identity module (SIM) card, so it is convenient for the user to take out the NFC circuit 120 from the NFC apparatus 100 if necessary. The SIM card includes a pad connected to the functionality of SIM card and a wireless interface capable of performing wireless communication. The NFC circuit 120 is used as an RFID tag for payment or identification of the user, and can provide requested data to the external RFID reader based on the signal(s) sent from the external RFID reader, without consuming the battery of the mobile phone, i.e., the NFC apparatus 100. The above-mentioned NFC circuits 120 and 125 both use the antenna unit 110 to perform respective RFID communications.

Since the NFC circuits 120 and 125 both use the antenna unit 110, it is important that the impedance should be matched. Therefore, the host circuit 105 of this embodiment timely informs the NFC circuit 125 to switch the state of the switching element SW so that the NFC apparatus 100 has better impedance matching characteristics when the NFC circuits 120 and 125 respectively use the antenna unit 110 for transmission. Under the first mode, the NFC circuit 125 controls the switching element SW to be in a closed state, wherein the default state of the switching element SW is also set as the closed state in this embodiment. Once the NFC circuit 120 receives a signal coming from an external RFID reader, the NFC circuit 120 communicates with the external RFID reader via the antenna unit 110 for performing identification of an RFID tag by the backscatter modulation technology. In addition, when the pier-to-pier data transmission or other data communication is desired, the NFC apparatus 100 is arranged to switch to the second mode from the first mode. Under the second mode, the NFC circuit 125 controls the switching element SW to be in an open state, and a circuit loop, including the NFC circuits 120 and 125, the impedance matching circuit 130a, and the antenna unit 110, is formed. The NFC circuit 125 then communicates with an external RFID reader or an external RFID tag through the impedance matching circuit 130a, the NFC circuit 120, and the antenna unit 110; at the same time, the NFC circuit 120 can still operate for RFID communication. It should be noted that the NFC circuit 125 may also receive data of the NFC circuit 120 (i.e. an RFID tag) when communicating with an external RFID tag since the NFC circuit 120 is located near the NFC circuit 125. In this situation, the NFC circuit 125 can be designed as not to read the data of the NFC circuit 120, to avoid incurring any error. The NFC circuit 125 switches the state of the switching element SW to the closed state after the communication or data transfer is finished. In practice, the NFC circuit 125 can be designed to immediately switch the state of the switching element SW to the closed state when the NFC circuit 125 is running out of power. An advantage of this design is that a circuit loop, including the NFC circuit 120, the switching element SW and the antenna unit 110, can still be established to maintain the operation of the NFC circuit 120 even though the NFC circuit 125 cannot operate due to the lack of power. In other words, when the NFC circuit 125 is lacking power, the external RFID reader can still access the data of the NFC circuit 120. Accordingly, it becomes more convenient for a user to use the NFC apparatus 100; for example, if the user travels to another location using the Metropolitan/Mass Rapid Transit (MRT) system and wishes to use the NFC apparatus 100 to pay traveling expenses, the NFC circuit 120 can be used for communicating with an RFID reader of the MRT system to make his/her payment regardless of whether the NFC apparatus 100 lacks power. Thus, the user can pass through the gate of the MRT system successfully. Additionally, because the NFC circuits 120 and 125 share the antenna unit 110, the manufacturing costs of the NFC apparatus will not increase and the size of the circuit area of the NFC apparatus 100 can be minimized. Moreover, since it is convenient for the user to take the NFC circuit 120 out of the NFC apparatus 100 to put into another mobile phone, the problem that an amount of remaining money recorded in the original mobile phone cannot be transferred to another apparatus is resolved.

Figure 2:
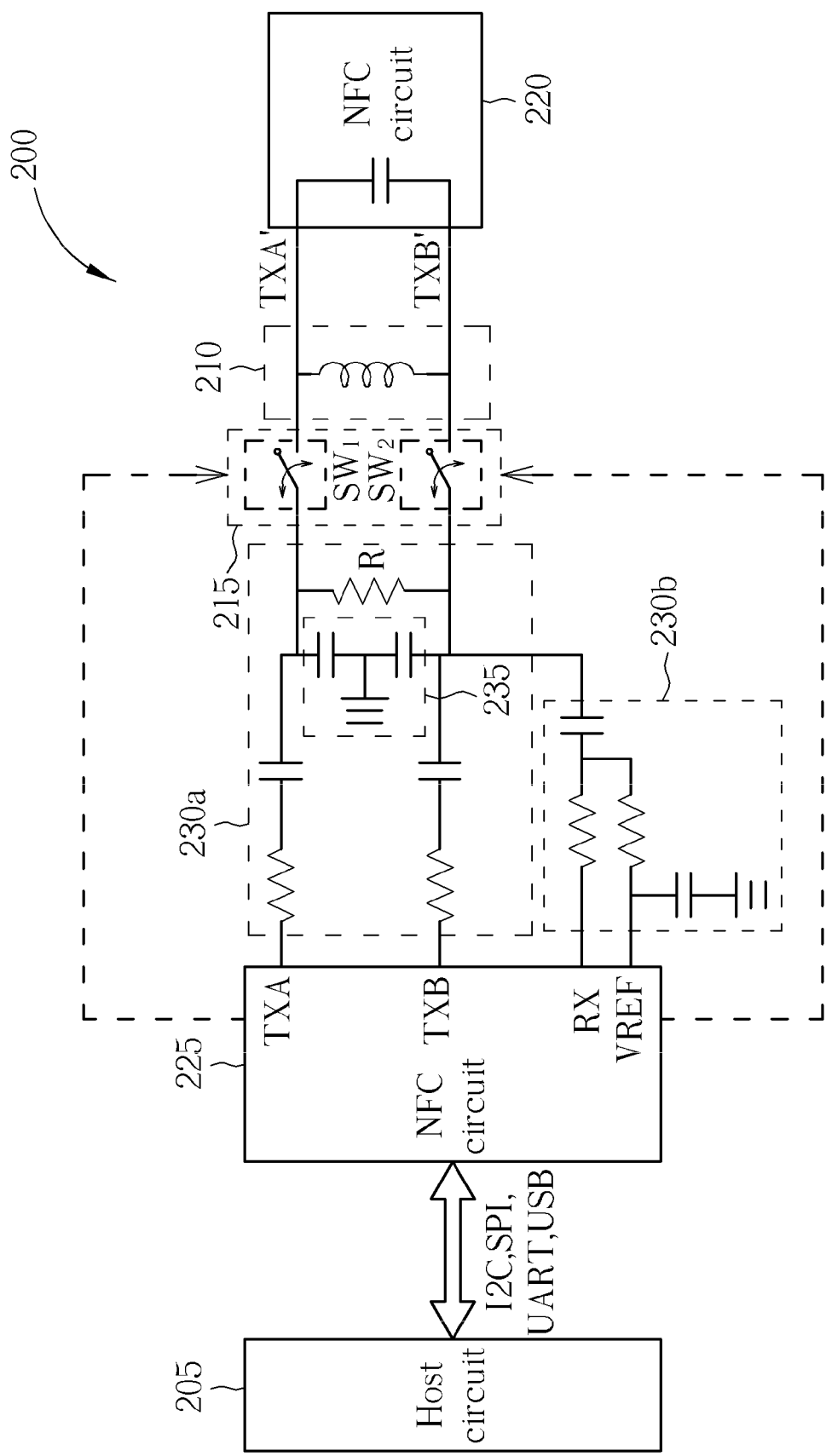
FIG. 2 is a diagram of an NFC apparatus according to a second embodiment of the present invention.

Please refer to FIG. 2. FIG. 2 is a diagram of an NFC apparatus 200 according to the second embodiment of the present invention. The difference between the NFC apparatuses 100 and 200 is that the NFC apparatus 100 utilizes a Normal Close switching element for implementation while the NFC apparatus 200 utilizes a Normal Open switching element for implementation. With regards to the circuitry, a switch module 215 is composed of switching elements $SW_1$ and $SW_2$. The first transmission terminal TXA' of the NFC circuit 220 is coupled to one end of the antenna unit 210 and one end of the switching element $SW_1$, the second transmission terminal TXB' of the NFC circuit 220 is coupled to the other end of the antenna unit 210 and one end of the switching element $SW_2$, the first transmission terminal of TXA of the NFC circuit 225 is coupled to the other end of the switching element $SW_1$, and the second transmission terminal TXB of the NFC circuit 225 is coupled to the other end of the switching element $SW_2$. Impedance matching circuits 230a, 230b, and a resistor R, are all used to carry out impedance matching for the antenna unit 110 with other circuits; the function of a voltage regulating and filtering circuit 235 is identical to that of the voltage regulating and filtering circuit 135. Under the first mode, the NFC circuit 225 controls the switching elements $SW_1$ and $SW_2$ to be in the open state; in this embodiment, the default state of the switching elements $SW_1$ and $SW_2$ are set as the open. The NFC circuit 220 under the first mode is arranged to communicate with an external RFID reader (e.g., an RFID reader of the MRT system) via the antenna unit 210 for performing identification of an RFID tag. In other words, the NFC circuit 220 can be used as an RFID tag for a payment scheme, and the RFID tag can be set up on a SIM card including a pad connected to the functionality of the SIM card and a wireless interface capable of performing wireless communication. Under the second mode, the NFC circuit 225 controls the switching elements $SW_1$ and $SW_2$ to be in the closed state, and the NFC circuit 225 can connect to the antenna unit 210 via the switching elements $SW_1$ and $SW_2$ so as to communicate with an external RFID reader or an external RFID tag. The advantage of the NFC apparatus 200 is similar to that of the NFC apparatus 100 of the first embodiment, and therefore is not further detailed here.

Figure 3:
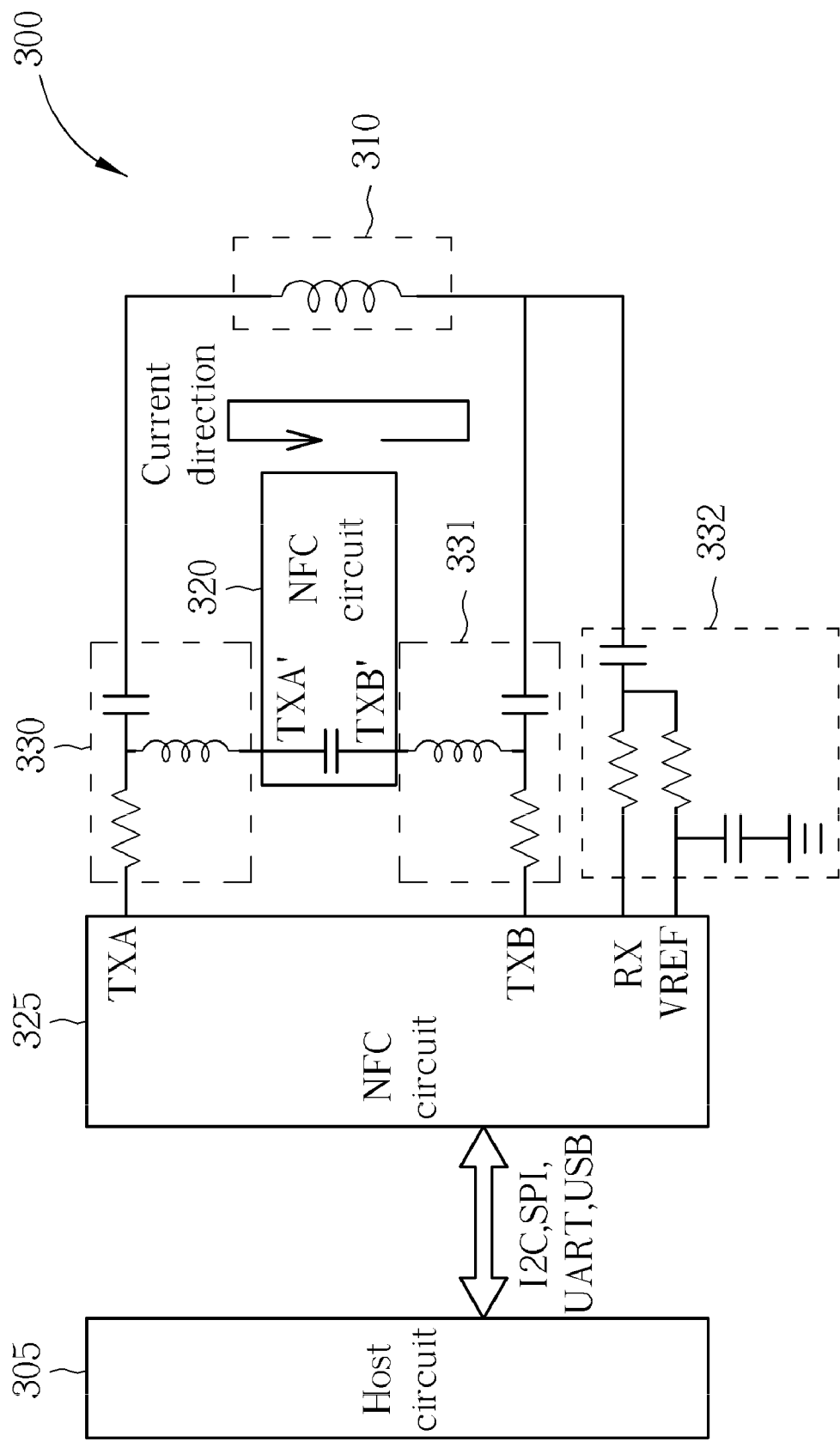
FIG. 3 is an operating diagram showing the operation of an NFC circuit within an NFC apparatus according to a third embodiment of the present invention.
Figure 4:
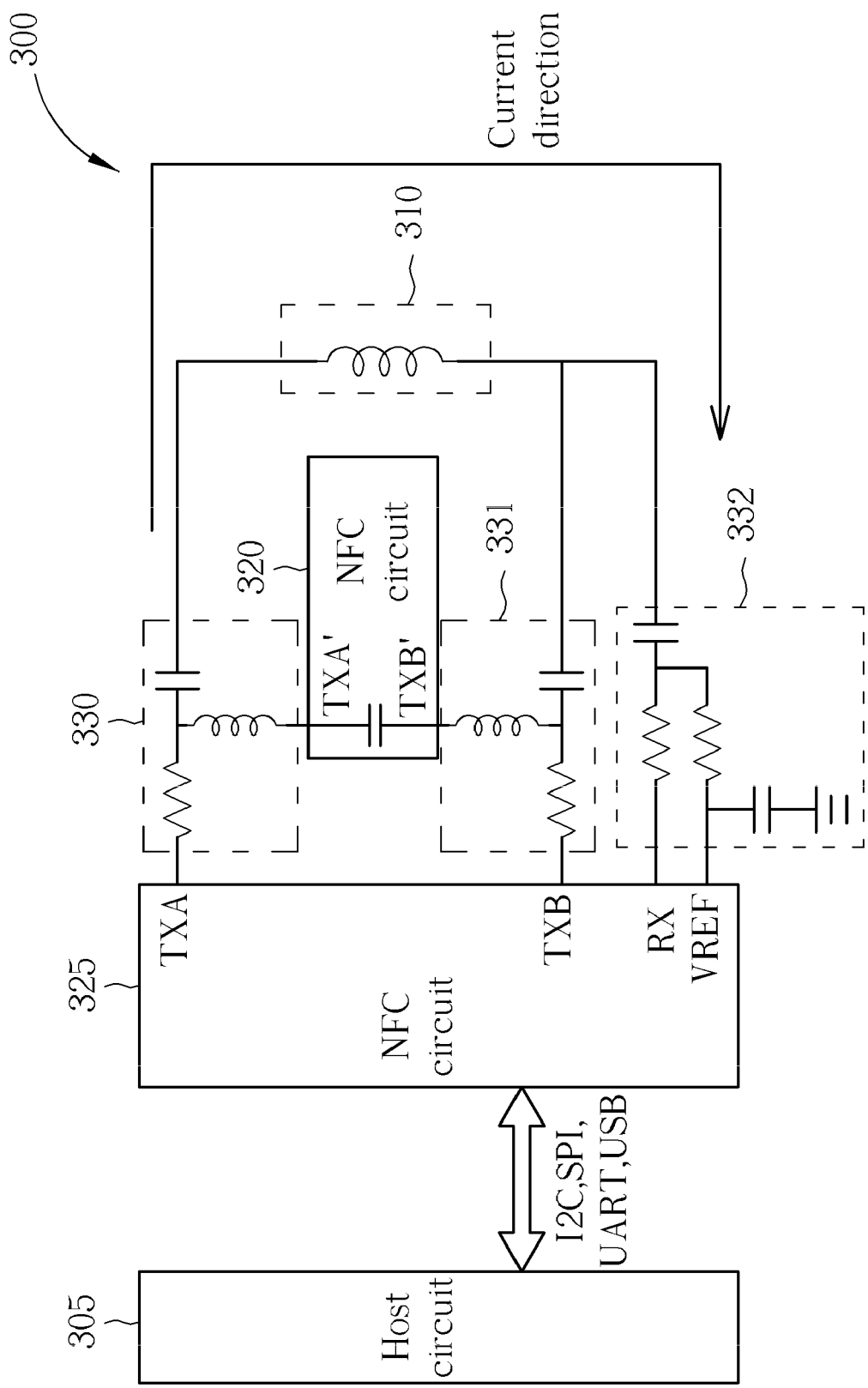
FIG. 4 is an operating diagram showing the operation of another NFC circuit within the NFC apparatus shown in FIG. 3.

Please refer to FIG. 3 in conjunction with FIG. 4. FIG. 3 and FIG. 4 respectively show the illustrative operating diagrams of NFC circuits 320 and 325 within an NFC apparatus 300 according to a third embodiment of the present invention. Compared to the NFC apparatuses 100 and 200, the NFC apparatus 300 does not use any switching element for circuit design. Instead the NFC apparatus 300 performs data communication with an external RFID reader or an external RFID tag by impedance matching circuits 330, 331, and 332, to achieve an objective of minimizing production costs. The first transmission terminal TXA' of the NFC circuit 320 is coupled to the impedance matching circuit 330, which is coupled to one end of the antenna unit 310. The second transmission terminal TXB' of the NFC circuit 320 is coupled to the impedance matching circuit 331, which is coupled to the other end of the antenna unit 310. In addition, the transmission terminals TXA and TXB of the NFC circuit 325 are respectively coupled to the impedance matching circuits 330 and 331. As shown in FIG. 3, under the first mode, the NFC circuit 320 communicates with an external RFID reader such as an RFID reader of the MRT system through the antenna unit 310 for achieving RFID tag identification. In other words, the NFC circuit 320 works as an RFID tag for a payment scheme or an identification scheme; moreover, the RFID tag can be set up on a SIM card, which includes a pad connected to the SIM card functionality and a wireless interface having the wireless communication operation. As shown in FIG. 4, under the second mode the NFC circuit 325 is arranged to communicate with an external RFID circuit or an external RFID tag through the impedance matching circuits 330 and 331, and the antenna unit 310. Please note that, even though the impedance matching circuits 330 and 331 of this embodiment are designed to be the same circuit, in another embodiment, the circuit design of the impedance matching circuit 330 can be different from that of the impedance matching circuit 331. This is not intended to be a limitation to the present invention. In addition, a designer can appropriately adjust the impedance matching circuits 330 and 331 to control the operation of the NFC circuit 325 for determining whether the NFC circuit 325 can receive/read signals sent from by the NFC circuit 320. The advantage of the NFC apparatus 300 is identical to that of the NFC apparatus 100 of the first embodiment, and therefore is not further detailed here for simplicity of the specification.

Those skilled in the art will readily observe that numerous modifications and alterations of the device and method may be made while retaining the teachings of the invention.

What is claimed is:

1. A wireless communication apparatus, comprising:
an antenna unit;
a switch module, coupled to the antenna unit;
a first wireless communication circuit, coupled to the antenna unit, for performing radio-frequency identification (RFID) communication via the antenna unit; and
a second wireless communication circuit, coupled to the switch module, for controlling a state of the switch module to perform RFID communication via the antenna unit;
wherein both the first and second wireless communication circuits use the antenna unit, and the switch module has a switching element, a first transmission terminal of the first wireless communication circuit is coupled to a first end of the antenna unit, a first transmission terminal of the second wireless communication circuit is coupled to a second end of the antenna unit and a first end of the switching element; and a second transmission terminal of the second wireless communication circuit is coupled to a second end of the switching element and a second transmission terminal of the first wireless communication circuit.

2. The wireless communication apparatus of claim 1, wherein under a first mode the second wireless communication circuit is arranged to control the switching element to be in a closed state, and the first wireless communication circuit is arranged to communicate with an external RFID reader via the antenna unit and the switching element; and under a second mode, the second wireless communication circuit is arranged to control the switching element to be in an open state, and the second wireless communication circuit is arranged to communicate with an external RFID reader or an external RFID tag via the first wireless communication circuit and the antenna unit.

3. The wireless communication apparatus of claim 2, wherein the first wireless communication circuit is an RFID tag and used as an electronic identification tag for a payment scheme.

4. The wireless communication apparatus of claim 3, wherein the electronic identification tag is set up on a subscriber identity module (SIM) card comprising a pad and a wireless interface.

5. The wireless communication apparatus of claim 2, wherein the second wireless communication circuit is an active RFID circuit, and the first wireless communication circuit is a semi-active/passive RFID circuit.

6. The wireless communication apparatus of claim 1, wherein the switch module comprises a first switching element and a second switching element; a first terminal of the first wireless communication circuit is coupled to one end of the antenna unit and one end of the first switching element; a second terminal of the first wireless communication circuit is coupled to the other end of the antenna unit and one end of the second switching element; a first terminal of the second wireless communication circuit is coupled to the other end of the first switching element; and a second terminal of the second wireless communication circuit is coupled to the other end of the second switching element.

7. The wireless communication apparatus of claim 6, wherein under a first mode the second wireless communication circuit is arranged to control the first and second switching elements to be in an open state, and the first wireless communication circuit is arranged to communicate with an external RFID reader via the antenna unit; and under a second mode the second wireless communication circuit is arranged to control the first and second switching elements to be in a closed state, and the second wireless communication circuit is connected to the antenna unit through the first and second switching elements to communicate with an external RFID circuit or an external RFID tag.

8. The wireless communication apparatus of claim 7, wherein the first wireless communication circuit is an RFID tag and used as an electronic identification tag for a payment scheme.

9. The wireless communication apparatus of claim 8, wherein the electronic identification tag is set up on a SIM card comprising a pad and a wireless interface.

10. The wireless communication apparatus of claim 7, wherein the second wireless communication circuit is an active RFID circuit, and the first wireless communication circuit is a semi-active/passive RFID circuit.

11. A wireless communication apparatus, comprising:
an antenna unit;
a first wireless communication circuit, coupled to the antenna unit, for performing RFID communication via the antenna unit; and
a second wireless communication circuit, coupled to the antenna unit, for performing RFID communication via the antenna unit,
wherein both the first and second wireless communication circuits use the antenna unit, and a first transmission terminal of the first wireless communication circuit is coupled to a first end of the antenna unit; a first transmission terminal of the second wireless communication circuit is coupled to the first end of the antenna unit and the first transmission terminal of the first wireless communication circuit; a second transmission terminal of the first wireless communication circuit is coupled to a second end of the antenna unit; and a second transmission terminal of the second wireless communication circuit is coupled to the second end of the antenna unit and the second transmission terminal of the first wireless communication circuit.

12. The wireless communication apparatus of claim 11, wherein under a first mode the first wireless communication circuit communicates with an external RFID reader through the antenna unit; and under a second mode the second wireless communication circuit communicates with an external RFID reader or an external RFID tag through the antenna unit.

13. The wireless communication apparatus of claim 12, wherein the first wireless communication circuit is an RFID tag and used as an electronic identification tag for a payment scheme.

14. The wireless communication apparatus of claim 13, wherein the electronic identification tag is set up on a SIM card comprising a pad and a wireless interface.

15. The wireless communication apparatus of claim 12, wherein the second wireless communication circuit is an active RFID circuit, and the first wireless communication circuit is a semi-active/passive RFID circuit.

* * * * *